Oct. 5, 1971   J. ALTHOUSE ET AL   3,610,039
DUCTED WAVE METER

Filed April 28, 1969   3 Sheets-Sheet 1

INVENTORS.
NOEL B. PLUTCHAK
JACK ALTHOUSE
BY DUANE E. MADDUX

Robert C. Smith
ATTORNEY

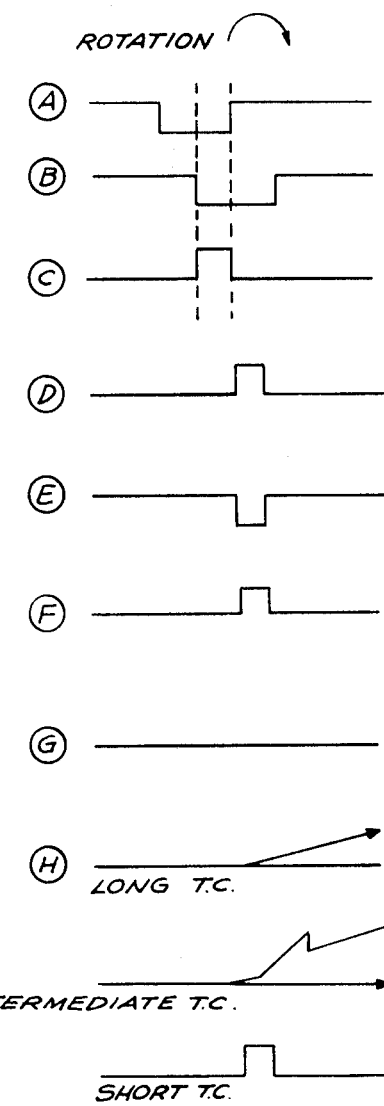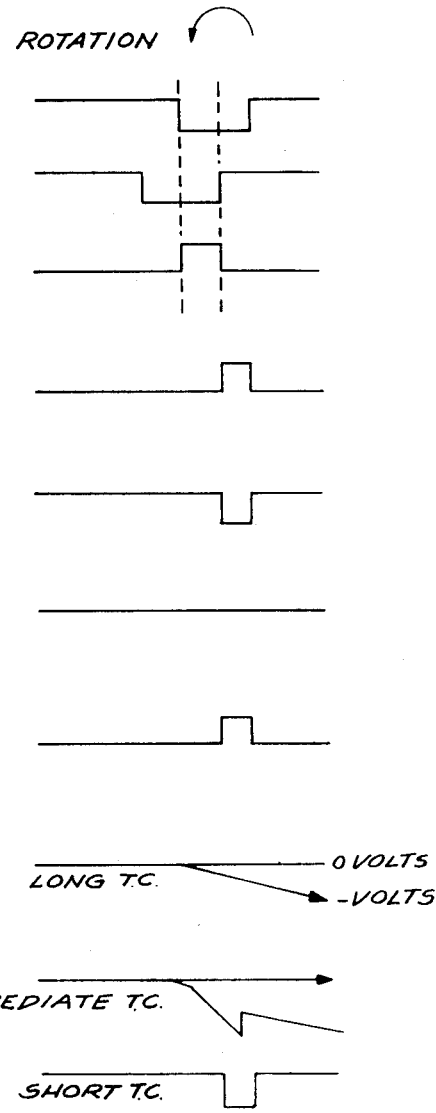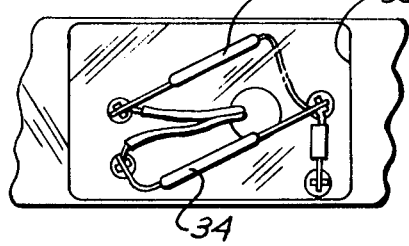

United States Patent Office 3,610,039
Patented Oct. 5, 1971

3,610,039
DUCTED WAVE METER
Jack Althouse, Escondido, Duane E. Maddux, Santee, and Noel B. Plutchak, San Diego, Calif., assignors to The Bendix Corporation
Filed Apr. 28, 1969, Ser. No. 819,866
Int. Cl. G01w 1/00; G08b 21/00; G01d 3/44
U.S. Cl. 73—189                                                         7 Claims

ABSTRACT OF THE DISCLOSURE

A meter for measuring wave characteristics is disclosed in which a pair of orthogonally positioned sensors are carried in the water on a pivotable shaft, each meter including an impeller contained in a shroud which prevents its responding to wave motion components other than those substantially parallel to its axis. Typically these meters are positioned to sense horizontal and vertical components of wave motion, and each produces an electrical pulse output whose frequency and pulse timing relationship varies with the velocity and direction, respectively, of the flow past the impeller. The pulse outputs are connected to amplification and gating circuits and time constant circuits producing an output which may consist of a series of pulses whose polarity and frequency are directly proportional to the direction and velocity of the impeller rotation, or which may be a substantially uniform direct current voltage whose polarity varies with direction of flow and whose magnitude is proportional to the average velocity of flow through the impeller integrated over a significant period, depending upon whether short term instantaneous peak values are desired, or longer term average values. The output signal may be utilized by any of a number of output devices such as a strip chart, a digital counter, etc.

BACKGROUND OF THE INVENTION

Probably the most widely accepted device for measuring water flow speed in the ocean is the Savonius rotor current meter. Because this meter responds to flow in the horizontal plane equally from any direction and because its rotor is unable to distinguish direction, it provides a distorted output when used near shore or near the surface when waves are present. Because of this shortcoming, the applicants' assignee has developed a current meter consisting of a small plastic impeller in a horizontally oriented cylindrical tube or duct. The duct assures that the impeller does not respond to vertical velocity. The impeller has small mass, and its response to the periodic wave velocities is good. Since the blades are flat, it responds equally to forward or backward flow. Typically, this current meter is fastened to a vane which is long relative to the normal wave or oscillatory motion amplitude. The vane holds the tube oriented with its axis aligned with the steady current. Since the response time of the meter is quite fast, the meter will actually produce an output signal having an alternating current reflecting the wave action; however, by integrating this output an average direct current level is provided which varies directly with actual current.

It has been found that, for certain shallow water studies such as in harbors and near piers, the averaging characteristic described above is not what is really desired. Frequently one wants to know actual instantaneous wave velocities and directions in order to determine forces against structures or for other reasons. In this connotation, it has been desired to know not only the horizontal direction of the wave forces but the vertical components as well.

SUMMARY OF THE INVENTION

In the system shown herein, applicants have combined a pair of high response ducted wave meters positioned at right angles on a supporting mast so that they are also pivotable. Each of these meters includes a low mass impeller and a means of producing electrical signals varying directly with the movement of the impeller. These signals vary as to time relationship and frequency, depending upon the direction and speed of rotation of the impeller. The output of each meter consists of two pulses whose time relationship is reversible with direction of rotation. The pulses from each impeller are supplied to an electronic circuit including a gate and timing means which operate to convert the input pulses into pulses of opposite polarity, depending upon direction of rotation of the impeller, and of length which is adjustable but which remains constant for a given measurement setting. These pulses, which are of constant amplitude but of variable polarity and frequency, are supplied to an integrator including switching means for varying the time constant of the system over a number of ranges. With the longest time constant selected, the output will tend to be that of a constant direct current whose polarity indicates the prevailing current direction and whose amplitude indicates its average velocity. With the shorter time constant selected, the output will assume a pulse characteristic, thus giving an output more nearly similar to that of the pulse input which reflects the wave action in the horizontal and vertical components on a short term basis. These output signals may then be supplied to any desired type of output device which is capable of displaying the information in the desired form such as strip charts, digital counters, or a cathode ray tube.

DESCRIPTION OF THE DRAWING

FIG. 3 is a plan view showing the switch arrangement depicted in FIG. 2 as seen from the top.

FIG. 5 shows a series of waveforms indicating the manner in which the pulse output of the reed switches of FIG. 3 is processed in FIG. 4 for one direction of rotation of the impeller.

FIG. 6 is a series of waveforms similar to those of FIG. 5 showing the signal processing of the reed switch pulses for the opposite direction of rotation of the impeller.

DESCRIPTION OF THE PREFERRED EMBODIMENT

Figure 1:
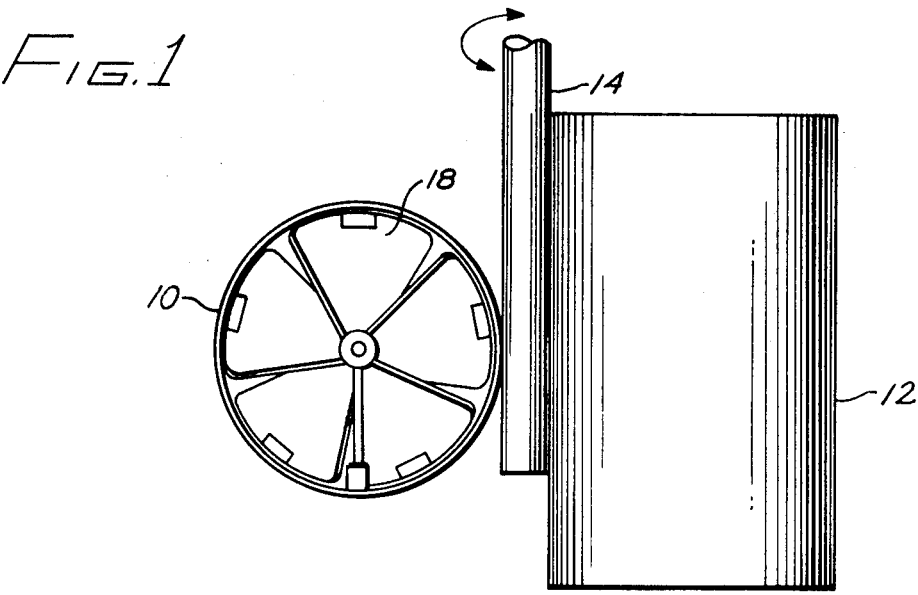
FIG. 1 is a plan view showing a pair of ducted wave meters attached at right angles to each other and to a support post rotatable around its axis.

Referring now to FIG. 1, it will be seen that a pair of ducted wave meters 10 and 12 are attached to a pivotable mounting shaft 14 at right angles to each other. Shaft 14 extends into the ocean or other desired liquid medium from a support means, not shown, and includes, or may include, an axial passageway for conducting electrical signals from the meters 10 and 12 to an instrument package, not shown. The meters are shown oriented vertically and horizontally, but could be arranged differently, such as having both oriented horizontally which would facilitate measuring wave components both parallel and perpendicular to a shoreline, dock or ship.

Figure 2:
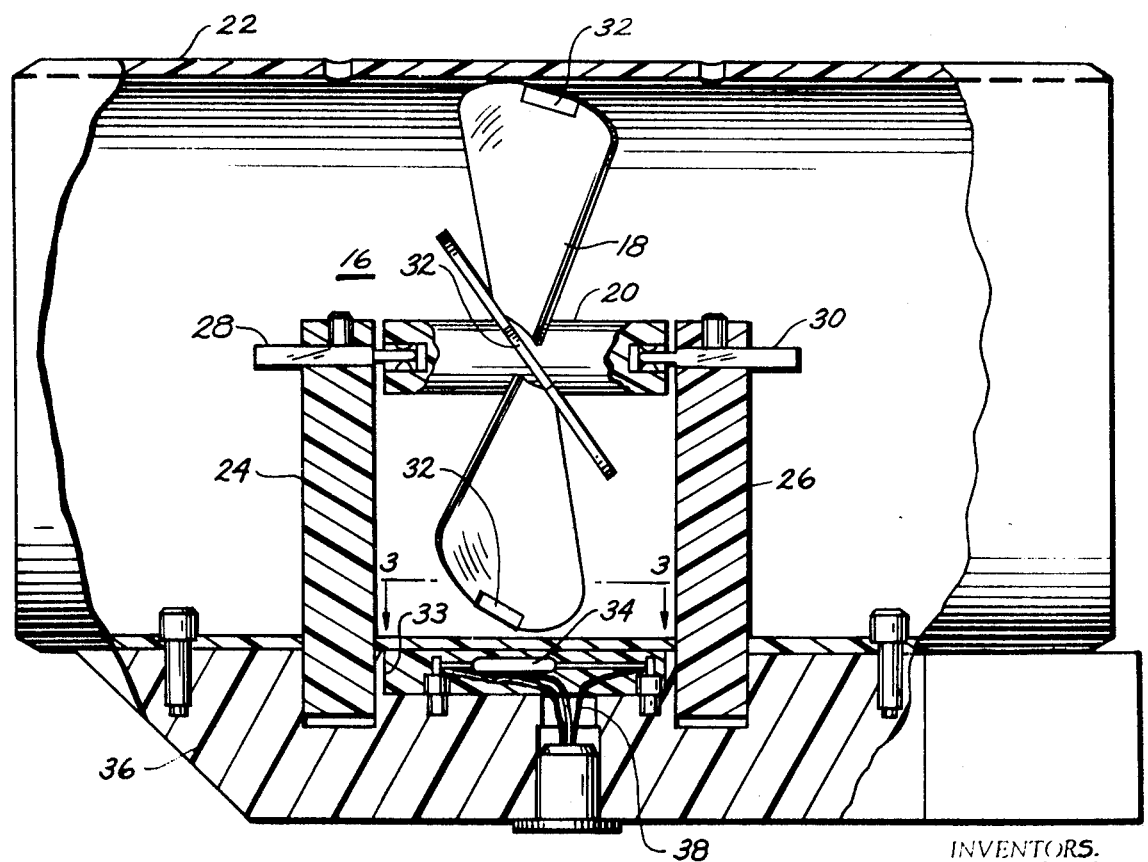
FIG. 2 is a side view, shown partially in section, of a typical ducted wave meter used in our invention.

Details of an individual ducted wave meter are shown in FIG. 2 wherein a portion of the drawing is depicted in section. An impeller 16, including a plurality of blades 18 mounted on an axle 20, is supported within a cylindrical duct or shroud 22 on a pair of support members 24, 26. Supports 24 and 26 carry bearing pins 28 and 30, respectively, cooperating with bearing surfaces forming part of the axle 20. Positioned at the outside edge of each of blades 18 is an insert 32 of magnetic material which, as it rotates near the bottom of shroud 22, exerts sufficient magnetic attraction to actuate a reed switch 34 which is carried in insulating material in a chamber 33 cut in a support 36 to which the shroud 22 and the impeller supports 24, 26 are attached. Switch 34 is connected to a plurality of wires 38 connected to an electrical circuit described below. Support means 36 is typically mounted to a pivotable shaft such as that shown in FIG. 1 at numeral 14. Any suitable mounting means may be used for attaching the sensors either horizontally or vertically with respect to shaft 14. By enclosing the impeller 16 in the cylindrical shroud 22, the impeller responds only to wave motion passing through the shroud 22 which is essentially coaxial with the axis of impeller 16. By making blades 18 of sufficient width that they substantially fill the circular area of the shroud 22 as seen from the end, flow between or around the blades is largely prevented, and the blades will respond very rapidly to current movement in either direction past them.

FIG. 3 is a plan view of the chamber 33 positioned in the support 36 showing the reed switch 34, as well as another reed switch 35, both of which are actuated from the proximity of magnetic insert members 32. It will be appreciated that as any specific blade crosses reed switches 34 and 35, its insert 32 must necessarily cross first reed switch 34 and then reed switch 35; or if the blade is turning in the opposite direction it will cross reed switch 35 first and then reed switch 34. This differing sequence in the pulse outputs produced by reed switches 34 and 35 is used to carry the directional intelligence to the electronic circuitry described below in connection with FIG. 4. Obviously, any suitable means for generating a similar output signal may be used in the impeller in place of the described reed switches. Applicants have also used small lamps and photocells to produce the desired pulse output. These have an advantage where the water contains suspended magnetic materials and also provides lower inertia and threshold response.

Figure 4:
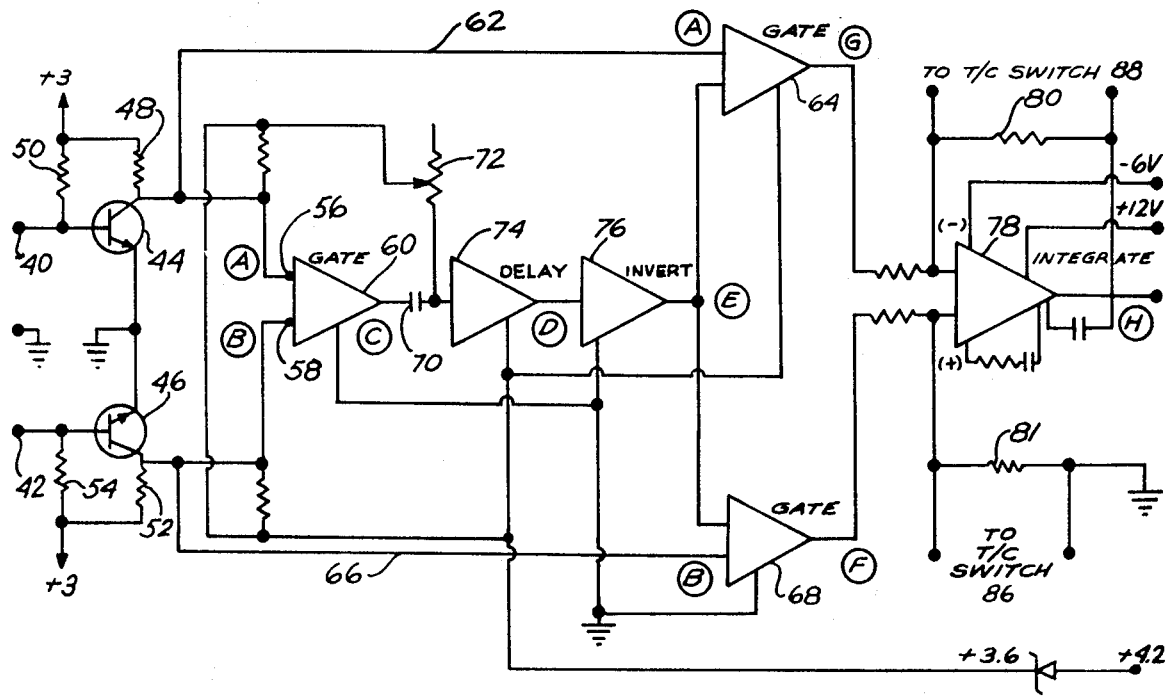
FIG. 4 is an electrical schematic drawing showing the signal processing means used in connection with each of the ducted meter devices shown in FIG. 2.

The electrical organization shown in schematic form in FIG. 4 shows the gating and switching means to which each of the ducted meter assemblies 10 and 12 is connected. Thus there is an organization like that of FIG. 4 for each of these meters, and only one is shown herein since the other is identical. In the present example, it will be understood that reed switch 34 is connected to terminal 40 and reed switch 35 is connected to terminal 42. Each of these terminals is connected to the base of a transistor, terminal 40 being connected to transistor 44 and terminal 42 to transistor 46. The direct current power source is shown connected to the collector of transistor 44 through a resistor 48. The second resistor connected to said source shown at 50 provides the required bias for the base of transistor 44. Similarly, transistor 46 has its collector connected to the same or an identical power source through a resistor 52 while its base is connected to this source through a biasing resistor 54. The emitters of transistors 44 and 46 are grounded, as shown, and the output from these transistors is connected to terminals 56 and 58 of an amplifier 60 which actually serves as an "AND gate device. The output from the collector of transistor 44 is also supplied through a line 62 to one of the input terminals of an "AND gate 64, and, similarly, the collector of transistor 46 is connected through a line 66 to one of the input terminals of an "AND gate 68. It will be seen that the output signal from transistor 44 is designated as A at the input terminals to each of these gates 60 and 64, and the output signal from transistor 46 is designated as B at the input terminals of gates 60 and 68. These signals are depicted by similar letters in FIGS. 5 and 6, FIG. 5 showing waveforms resulting from rotation in a clockwise manner as indicated and FIG. 6 showing the waveforms resulting from counterclockwise rotation. As will be seen, from clockwise rotation the pulse input at terminal 40 precedes or occurs earlier in time than the pulse input to terminal 42, and consequently pulse A leads pulse B. For counterclockwise rotation, exactly the opposite is true, as shown in FIG. 6.

As shown, gate or amplifier 60 will not conduct unless pulses are present simultaneously at inputs 56 and 58. Thus the output C from gate 60 is a pulse of narrower width than either A or B and effectively displaced in time, depending upon the direction of rotation. The pulse appearing at C is adjusted as to width by means of a time constant arrangement consisting of a capacitor 70 and a potentiometer 72 to be somewhat shorter than the length of the trailing portion of the leading pulse for the purpose of avoiding undesirable overlap. This may need to be adjusted, depending upon the velocites expected to be encountered. This narrower width pulse is delayed slightly in an amplifier 74 so that its time relation as it appears at the output of amplifier 74 is as shown in the curve D of FIGS. 5 and 6. As indicated, this pulse width is determined by the time constant of 70, 72. Pulse D is inverted in inverter 76 which gives it the waveform shown in curve E and which is supplied as one of the input signals to each of gates 64 and 68. This inverter 76 provides a pulse of the same polarity as the input pulses A and B to gates 64 and 68. These gates are also of the type which conduct only during the time a pulse is present at both input terminals thereto. Thus, as shown in FIG. 5, during a period of clockwise rotation input B is present at terminal 58 and at one of the input terminals to gate 68. The delayed and inverted pulse from gate 76 also appears at gates 64 and 68. The appearance of the delayed pulse at one of the input terminals to gate 68 will be coincident with the trailing half of the trailing pulse B also supplied to gate 68, causing that gate to conduct.

It will be noted that the delayed and inverted pulse E also appears at one of the input terminals to gate 64, but as there is no coincident pulse A at gate 64, that particular gate does not conduct. This produces a signal F at the output of gate 68 while no output pulse is shown at G. Pulse F is introduced to the positive input terminal of an integrator 78 whose output is a positive D.C. voltage and whose slope is determined by a time constant switch shunting a resistor 81. The time constant switch 82 is shown in detail in FIG. 4a and is discussed below.

With reference to FIG. 6, it will be seen that the operation of the device in FIG. 4 is completely analogous in the opposite channel for counterclockwise rotation. In this case, the waveform B precedes that of A, and the resulting pulse C is displaced somewhat to the right or later in time as compared with FIG. 5. The inverted pulse E now arrives at an input to gate 64 at a time coincident with the trailing edge of pulse A which is of the same polarity, thereby causing gate 64 to conduct whereby pulse G is caused to appear at the negative input to integrator 78. Thus integrator 78 sees a negative input for a counterclockwise rotation and a positive input for a clockwise rotation, as set forth above.

Figure 4A:
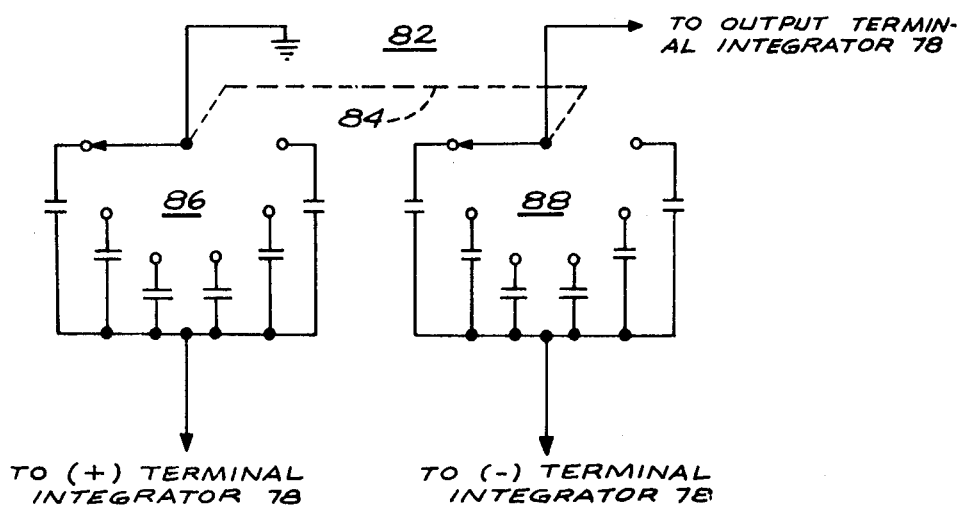
FIG. 4a is a circuit diagram showing the time constant switch used in association with the device of FIG. 4.

In FIG. 4a the time constant switch 82 is shown which is connected across the resistors 80 and 81 of FIG. 4. Switch 82 shows coordinated mechanical means 84 connected to a first group of capacitors 86 which act to shunt resistor 81 at the plus input to the integrator 78 and a second group of capacitors 88 which act to shunt resistor 80 connected to the negative input terminal of integrator 78. By changing the time constant switch 82 to pick any of the several capacitors shown, the effective shape of the output H from integrator 78 is changed as shown in the diagrams to represent long, intermediate and short time constants. Where the longest time constant is chosen, the output will be effectively a direct current signal representing long term wave velocity, whereas when the shorter time constants are chosen the output will be a pulse output more nearly similar to the input and will reflect the shorter term changes in wave action. The several time constant positions shown on switch 82 make it possible to separately analyze components of wave action having a number of different periods. The selection of time constant will, of course, depend upon the nature of output desired for a particular study or application. It will be appreciated that as the rotor speed increases and decreases, the positive voltage output increases and decreases. As the rotor stops and reverses, the integrator output decreases to zero and swings negative.

Alternatively the output of the gating circuits may be connected to strip charts for analysis of individual wave periods.

What is claimed is:

1. A wave meter for determining orthogonally directed components of wave velocities comprising:
   first and second meters, each of which includes a reversible impeller and support means therefor, a generally cylindrical duct enclosing said impeller except at its ends, and means for generating electrical pulse signals from said meters varying with speed and direction of rotation of said impeller;
   a pivotable support shaft and means mounting said meters at right angles to each other on said shaft; and
   signal processing means connected to each of said meters including gate means responsive to said pulse signals for producing signals varying in frequency and polarity with the speed and direction of rotation of said impeller, integration means receiving said gating pulses for producing an integrated signal of the same polarity as its input, and time constant means connected to said integration means for controlling the time constant of said integrated signal.

2. A wave meter as set forth in claim 1 wherein said first and second meters are both attached to said support shaft to sense substantially horizontal components of wave action at right angles to each other.

3. A wave meter as set forth in claim 1 wherein said first and second meters are attached to said support shaft to sense horizontal and vertical components of wave action.

4. A wave meter as set forth in claim 1 wherein said time constant means includes resistance means and a plurality of inductive devices, and switching means are provided for selectively connecting specific inductive devices in circuit with said resistance means to vary said time constant.

5. A wave meter as set forth in claim 1 wherein said inductive devices are capacitors selectively connectable to said resistance means to vary said time constant.

6. A wave meter as set forth in claim 1 wherein said means for generating electrical pulse signals includes a voltage source, reed switch means connectable to said source and located adjacent the interior surface of said duct, and inserts of magnetic material fastened to the blades of said impeller for actuating said reed switch means as each of said inserts is caused to rotate to a position adjacent said reed switch.

7. A wave meter as set forth in claim 6 wherein a pair of reed switches are associated with each said impeller such that the order of actuation of said switches is dependent upon the direction of rotation of said impeller.

References Cited

UNITED STATES PATENTS

| 3,292,431 | 12/1966 | Young | 73—155 |
| 3,299,702 | 1/1967 | Hulme | 73—188 |
| 3,352,154 | 11/1967 | Djorup | 73—189 |
| 3,370,465 | 2/1968 | Belle | 73—230 |

FOREIGN PATENTS

| 509,222 | 6/1955 | Italy | 73—189 |
| 128,153 | 6/1959 | U.S.S.R. | 73—170 |

RICHARD C. QUEISSER, Primary Examiner

C. E. SNEE III, Assistant Examiner

U.S. Cl. X.R.

73—231; 324—168; 340—263